March 12, 1968 W. R. LINKE 3,372,974
MECHANICALLY COMPENSATED ZOOM LENS SYSTEM
Filed April 2, 1964 2 Sheets-Sheet 2
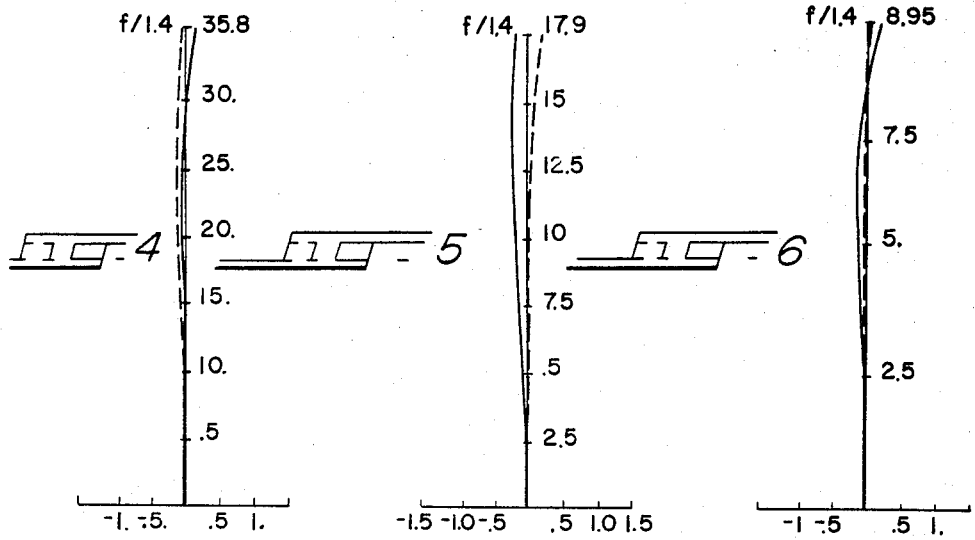
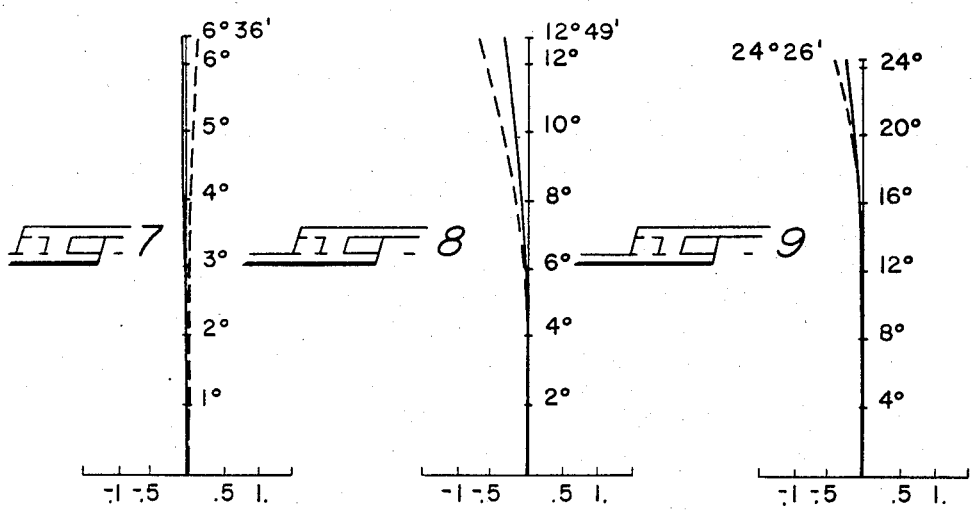
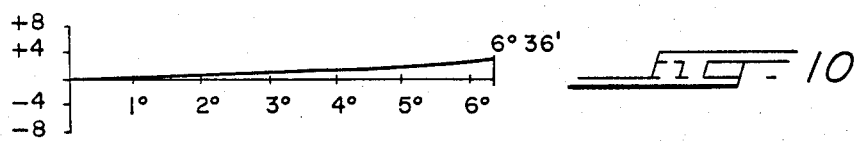
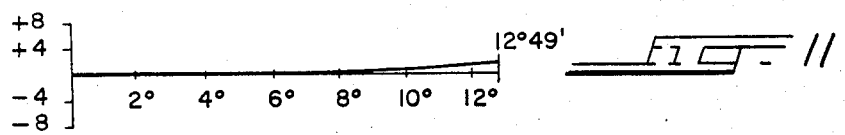
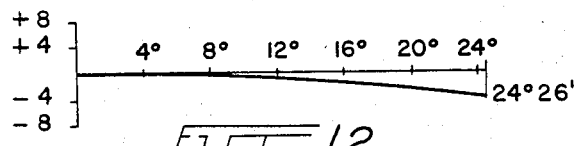
INVENTOR
WALTER R. LINKE
BY Barry L. Clark
John E. Peele Jr.
ATTYS

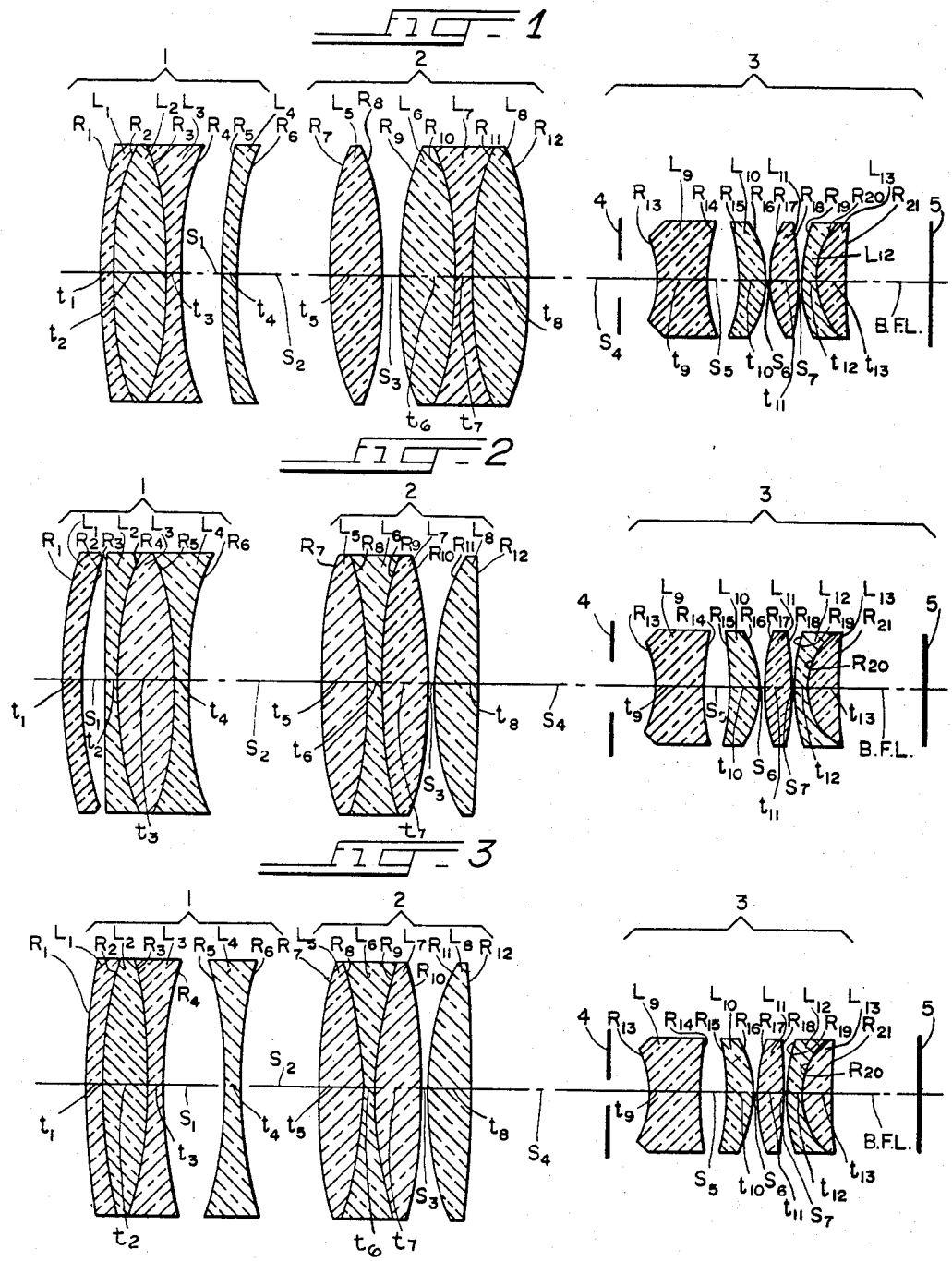

United States Patent Office 3,372,974
Patented Mar. 12, 1968

3,372,974
MECHANICALLY COMPENSATED ZOOM
LENS SYSTEM
Walter R. Linke, Chicago, Ill., assignor to Bell & Howell
Company, Chicago, Ill., a corporation of Illinois
Filed Apr. 2, 1964, Ser. No. 356,769
3 Claims. (Cl. 350—186)

ABSTRACT OF THE DISCLOSURE

An optical zoom system having a positive member movable for zooming and mounted between and in axial alignment with a front negative member, movable for image compensation, and a fixed rear positive member or prime lens, the said zoom system being highly corrected for lens aberrations at large apertures. The movable positive member may comprise two biconvex components or a cemented triplet and a single lens element or four lens elements including two cemented surfaces of negative power.

---

This invention relates to zoom lens systems of the mechanical compensation type.

It is well known that by moving one member or component of an optical system (except in collimated light) the magnification is made to change, but the image position shifts. In many cases, it is inconvenient to move the image receptor (e.g., photographic plate) for maintaining sharp focus, and so a second member of the lens system is moved in such a way as to maintain the image in a fixed position while its size changes, and this constitutes a zoom system.

The present invention is not concerned with optical compensation systems, in which there is a linear relationship between the movements of the two or more movable members, but is confined to the mechanical compensation type in which the movements are controlled by cams or some mechanical arrangement equivalent to a cam.

The object of the present invention is to provide an optical zoom system of the type comprising a positive member movable for zooming and mounted between and in axial alignment with a front negative member, movable for image compensation, and a fixed rear positive member or prime lens, the said zoom system being highly corrected for lens aberrations at apertures of about $f/1.2$ to $f/1.4$ and covering zoom ranges of about 3-to-1 up to about 4-to-1. The front negative member may also be moved for focusing in known manner.

According to one feature of the invention, a zoom system of the above-described type is made up in which the movable positive member consists of two biconvex components, at least one of which is compound and includes a cemented surface of negative power and in which the negative member consists of two negative components, both concave toward the rear, one of which is a cemented triplet having two cemented surfaces of positive power.

According to a preferred form of the invention, the movable positive member comprises four lens elements and includes two cemented surfaces of negative power.

According to another preferred form of the invention, the movable positive member consists of a cemented triplet and a single lens element. Thus, in this preferred form, each movable member consists of a simple element and a cemented triplet, and each of these may be arranged either with a triplet in front or with the simple element in front.

According to another feature of the invention, a zoom system of the above-described type is made up in which the prime lens consists of a front biconcave component and three positive components therebehind of which the first is concave toward the biconcave component, the second is biconvex and the third is convex to the front and has a cemented surface of negative power. Preferably, the rearmost surface is concave and has a radius of curvature greater than twice that of the front surface of the rear component.

As is known in the zoom lens art, the zooming portion of the system determines the zoom range (i.e., the ratio of the longest focal length to the shortest focal length) and should be designed to minimize the variation in the several lens aberrations (spherical aberration, coma, image curvature, astigmatism, distortion, axial color and lateral color) as the members are moved for zooming. The prime lens determines the focal length (the minimum focal length or the mean focal length or whatever one chooses as a measure of focal length) and should be designed to have aberrations equal and opposite to the average aberrations of the zooming portion of the system. It is known to selectively combine the same zooming portion with any of two or more prime lenses so as to provide a selection of focal length ranges.

Accordingly, I consider the novel features of the zooming portion of the system according to my invention to be useful in combination with other types of prime lens, and the novel features of the prime lens to be useful in other combinations also, that is with zoom systems which are not necessarily made in accordance with my invention.

Further preferred features of construction will be described with reference to the accompanying drawings, in which:

FIGURES 1, 2 and 3 show preferred embodiments of the invention differing among themselves in the arrangements of the components within each movable member and in other minor details of construction.

FIGURE 1 shows an embodiment in which the positive zooming member 2 consists of a single biconvex element $L_5$ in front of a biconvex triplet $L_6$ $L_7$ $L_8$. The compensating member 1 consists of a negative cemented triplet component $L_1$ $L_2$ $L_3$ in front of a simple negative component $L_4$, both these components being concave to the rear, all in accordance with preferred features of the invention. The space $S_2$ between these two members is varied to vary the focal length of this portion of the system, and the space $S_4$ behind the positive member is varied exactly as the back focal length of this portion of the system varies whereby the image formed by the prime lens member 3 is maintained stationary at the focal plane 5. The movement of the negative member 1 is in accordance with the sum of the two variable spaces $S_2$ and $S_4$.

Table 1, below, gives specifications for one example of the embodiment shown in FIGURE 1. This example is intended for use as an $f/1.2$ lens on an 8 mm. movie camera and has a zooming range of about 3 to 1 (19.94 to 6.54 mm.).

In the tables below the lens elements L, the radii of curvature R, the lens thicknesses $t$, the spaces $s$, the refractive indices N (for the sodium D line) and the conventional dispersive indices V are each numbered from front to rear, and as is customary, positive and negative values of radii denote surfaces respectively convex and concave toward the front.

TABLE 1

E.F.L.=0.7851 (Telephoto)
.5422 (Intermediate)
.2575 (Wide Angle)
B.F.L.= .317

[In inches]

| | | | | |
|---|---|---|---|---|
| $L_1$ | $R_1 = +3.333$ | $t_1 = .040$ | $N_1 = 1.651$ | $V_1 = 55.8$ |
| | $R_2 = +1.724$ | | | |
| $L_2$ | | $t_2 = .180$ | $N_2 = 1.720$ | $V_2 = 29.3$ |
| | $R_3 = -1.075$ | | | |
| $L_3$ | | $t_3 = .040$ | $N_3 = 1.651$ | $V_3 = 55.8$ |
| | $R_4 = +1.082$ | $s_1 = .095$ | | |
| | $R_5 = +9.091$ | | | |
| $L_4$ | | $t_4 = .050$ | $N_4 = 1.734$ | $V_4 = 51.0$ |
| | $R_6 = +1.149$ | | | |
| | | $s_2 = .210$ [1] | | |
| | | $.479$ [2] | | |
| | | $1.515$ [3] | | |
| | $R_7 = +3.509$ | | | |
| $L_5$ | | $t_5 = .120$ | $N_5 = 1.697$ | $V_5 = 56.2$ |
| | $R_8 = -2.564$ | $s_3 = .004$ | | |
| | $R_9 = +1.000$ | | | |
| $L_6$ | | $t_6 = .170$ | $N_6 = 1.637$ | $V_6 = 55.5$ |
| | $R_{10} = -2.500$ | | | |
| $L_7$ | | $t_7 = .040$ | $N_7 = 1.751$ | $V_7 = 27.7$ |
| | $R_{11} = +.909$ | | | |
| $L_8$ | | $t_8 = .150$ | $N_8 = 1.697$ | $V_8 = 56.2$ |
| | $R_{12} = -3.030$ | | | |
| | | $s_4 = 1.000$ [1] | | |
| | | $.654$ [2] | | |
| | | $.247$ [3] | | |
| | $R_{13} = -.377$ | | | |
| $L_9$ | | $t_9 = .180$ | $N_9 = 1.649$ | $V_9 = 35.8$ |
| | $R_{14} = +.961$ | $s_5 = .095$ | | |
| | $R_{15} = -1.351$ | | | |
| $L_{10}$ | | $t_{10} = .120$ | $N_{10} = 1.734$ | $V_{10} = 51.0$ |
| | $R_{16} = -.469$ | $s_6 = .005$ | | |
| | $R_{17} = +.735$ | | | |
| $L_{11}$ | | $t_{11} = .120$ | $N_{11} = 1.734$ | $V_{11} = 51.0$ |
| | $R_{18} = -2.237$ | $s_7 = .005$ | | |
| | $R_{19} = +.840$ | | | |
| $L_{12}$ | | $t_{12} = .040$ | $N_{12} = 1.720$ | $V_{12} = 29.3$ |
| | $R_{20} = +.333$ | | | |
| $L_{13}$ | | $t_{13} = .150$ | $N_{13} = 1.697$ | $V_{13} = 56.2$ |
| | $R_{21} = +3.333$ | | | |

[1] Telephoto.  [2] Intermediate.  [3] Wide angle.

The aperture stop 4 is conveniently .175" in front of the vertex of $R_{13}$.

FIGURE 2 shows a somewhat different arrangement according to the invention. The members 1, 2, 3 of the zoom system and the variable spaces $s_2$ and $s_4$ function in the same way as in the example shown in FIGURE 1. In this case, however, the triplet $L_2$ $L_3$ $L_4$ is behind the single element $L_1$ in the negative member 1, and the positive member 2 the triplet $L_5$ $L_6$ $L_7$ is in front of the single element $L_8$.

Table 2, below, gives specifications for one example of the embodiment shown in FIGURE 2. This example is intended for use as f/1.4 lens and has a zooming range of about 4 to 1 (27.03 to 6.55 mm.).

TABLE 2

E.F.L.=1.064 (Telephoto)
.530 (Median)
.258 (Wide Angle)
B.F.L.= .346

[In inches]

| | | | | |
|---|---|---|---|---|
| $L_1$ | $R_1 = +3.333$ | $t_1 = .050$ | $N_1 = 1.734$ | $V_1 = 51.0$ |
| | $R_2 = +1.471$ | $s_1 = .075$ | | |
| | $R_3 = -100.0$ | | | |
| $L_2$ | | $t_2 = .040$ | $N_2 = 1.734$ | $V_2 = 51.0$ |
| | $R_4 = +1.493$ | | | |
| $L_3$ | | $t_3 = .220$ | $N_3 = 1.720$ | $V_3 = 29.3$ |
| | $R_5 = -1.493$ | | | |
| $L_4$ | | $t_4 = .040$ | $N_4 = 1.734$ | $V_4 = 51.0$ |
| | $R_6 = +1.664$ | | | |
| | | $s_2 = .090$ [1] | | |
| | | $.750$ [2] | | |
| | | $2.150$ [3] | | |

See footnotes at end of table.

TABLE 2—Continued

| | | | | |
|---|---|---|---|---|
| $L_5$ | $R_7 = +2.105$ | $t_5 = .180$ | $N_5 = 1.651$ | $V_5 = 55.8$ |
| | $R_8 = -1.538$ | | | |
| $L_6$ | | $t_6 = .040$ | $N_6 = 1.751$ | $V_6 = 27.7$ |
| | $R_9 = +1.538$ | | | |
| $L_7$ | | $t_7 = .190$ | $N_7 = 1.651$ | $V_7 = 55.8$ |
| | $R_{10} = -2.165$ | $s_3 = .004$ | | |
| | $R_{11} = +1.258$ | | | |
| $L_8$ | | $t_8 = .160$ | $N_8 = 1.620$ | $V_8 = 60.3$ |
| | $R_{12} = -9.804$ | | | |
| | | $s_4 = 1.690$ [1] | | |
| | | $.890$ [2] | | |
| | | $.490$ [3] | | |
| | $R_{13} = -.370$ | | | |
| $L_9$ | | $t_9 = .180$ | $N_9 = 1.589$ | $V_9 = 61.0$ |
| | $R_{14} = +1.218$ | $s_5 = .100$ | | |
| | $R_{15} = -1.075$ | | | |
| $L_{10}$ | | $t_{10} = .110$ | $N_{10} = 1.755$ | $V_{10} = 47.2$ |
| | $R_{16} = -.483$ | $s_6 = .005$ | | |
| | $R_{17} = +.739$ | | | |
| $L_{11}$ | | $t_{11} = .110$ | $N_{11} = 1.697$ | $V_{11} = 56.2$ |
| | $R_{18} = -2.451$ | $s_7 = .005$ | | |
| | $R_{19} = +.813$ | | | |
| $L_{12}$ | | $t_{12} = .050$ | $N_{12} = 1.751$ | $V_{12} = 27.7$ |
| | $R_{20} = +.253$ | | | |
| $L_{13}$ | | $t_{13} = .120$ | $N_{13} = 1.697$ | $V_{13} = 56.2$ |
| | $R_{21} = +3.333$ | | | |

[1] Telephoto.  [2] Median.  [3] Wide angle.

The aperture stop is conveniently at a distance of 0.140" in front of the vertex of $R_{13}$.

FIGURE 3 shows still another arrangement according to the invention, in which the triplet $L_1$ $L_2$ $L_3$ is in front of the single element $L_4$ in the negative member (as in FIGURE 1) and the triplet $L_5$ $L_6$ $L_7$ is in front of the single element $L_8$ in the positive member (as in FIGURE 2). The members 1, 2 and 3 and the variable spaces $s_2$ and $s_4$ function as before (see description of FIGURE 1).

TABLE 3

E.F.L.=1.0181 (Telephoto)
.7522 (Intermediate)
.2589 (Wide Angle)
B.F.L.= .416

[In inches]

| | | | | |
|---|---|---|---|---|
| $L_1$ | $R_1 = +12.853$ | $t_1 = .040$ | $N_1 = 1.697$ | $V_1 = 56.2$ |
| | $R_2 = +2.320$ | | | |
| $L_2$ | | $t_2 = .250$ | $N_2 = 1.751$ | $V_2 = 27.7$ |
| | $R_3 = -1.250$ | | | |
| $L_3$ | | $t_3 = .040$ | $N_3 = 1.697$ | $V_3 = 56.2$ |
| | $R_4 = +1.800$ | $s_1 = .090$ | | |
| | $R_5 = -10.916$ | | | |
| $L_4$ | | $t_4 = .040$ | $N_4 = 1.751$ | $V_4 = 27.7$ |
| | $R_6 = +2.631$ | | | |
| | | $s_2 = .095$ [1] | | |
| | | $.357$ [2] | | |
| | | $2.350$ [3] | | |
| | $R_7 = +6.482$ | | | |
| $L_5$ | | $t_5 = .135$ | $N_5 = 1.697$ | $V_5 = 56.2$ |
| | $R_8 = -3.200$ | | | |
| $L_6$ | | $t_6 = .040$ | $N_6 = 1.720$ | $V_6 = 29.3$ |
| | $R_9 = +.957$ | | | |
| $L_7$ | | $t_7 = .250$ | $N_7 = 1.697$ | $V_7 = 56.2$ |
| | $R_{10} = -2.883$ | $s_3 = .004$ | | |
| | $R_{11} = +1.599$ | | | |
| $L_8$ | | $t_8 = .170$ | $N_8 = 1.734$ | $V_8 = 51.0$ |
| | $R_{12} = -11.110$ | | | |
| | | $s_4 = 1.880$ [1] | | |
| | | $1.392$ [2] | | |
| | | $.480$ [3] | | |
| | $R_{13} = -.349$ | | | |
| $L_9$ | | $t_9 = .195$ | $N_9 = 1.589$ | $V_9 = 61.0$ |
| | $R_{14} = +1.392$ | $s_5 = .095$ | | |
| | $R_{15} = -.957$ | | | |
| $L_{10}$ | | $t_{10} = .110$ | $N_{10} = 1.697$ | $V_{10} = 56.2$ |
| | $R_{16} = -.434$ | $s_6 = .005$ | | |
| | $R_{17} = +.720$ | | | |
| $L_{11}$ | | $t_{11} = .110$ | $N_{11} = 1.697$ | $V_{11} = 56.2$ |
| | $R_{18} = -3.950$ | $s_7 = .005$ | | |
| | $R_{19} = +.826$ | | | |
| $L_{12}$ | | $t_{12} = .040$ | $N_{12} = 1.751$ | $V_{12} = 27.7$ |
| | $R_{20} = +.279$ | | | |
| $L_{13}$ | | $t_{13} = .160$ | $N_{13} = 1.697$ | $V_{13} = 56.2$ |
| | $R_{21} = +3.337$ | | | |

[1] Telephoto.  [2] Intermediate.  [3] Wide angle.

Table 3, above, gives specifications for a preferred example of the embodiment shown in FIGURE 3. This example is intended for use as an $f/1.4$ lens and has a zooming range of about 4 to 1 (25.86 to 6.58 mm.).

In this example the aperture stop is conveniently 0.110″ in front of the vertex of $R_{13}$.

Table 4, below, gives specifications for a second example of the embodiment shown in FIGURE 3.

TABLE 4.—(FIGURES 3–12)

E.F.L.=1.0027 (Telephoto)
.5107 (Median)
.2556 (Wide Angle)

B.F.L.= .4037

| | | | | |
|---|---|---|---|---|
| $L_1$ | $R_1 = +13.361$ | $t_1 = .04$ | $N_1=1.697$ | $V_1=56.2$ |
| | $R_2 = + 2.187$ | $t_2 = .25$ | $N_2=1.751$ | $V_2=27.7$ |
| $L_2$ | $R_3 = - 1.411$ | $t_3 = .04$ | $N_3=1.697$ | $V_3=56.2$ |
| $L_3$ | $R_4 = + 1.760$ | $s_1 = .09$ | | |
| | $R_5 = -12.68$ | $t_4 = .04$ | $N_4=1.751$ | $V_4=27.7$ |
| $L_4$ | $R_6 = + 2.700$ | $s_2 = .090$ [1] .832 [2] 2.340 [3] | | |
| $L_5$ | $R_7 = + 6.482$ | $t_5 = .135$ | $N_5=1.697$ | $V_5=56.2$ |
| | $R_8 = - 3.063$ | $t_6 = .04$ | $N_6=1.751$ | $V_6=27.7$ |
| $L_6$ | $R_9 = + 1.000$ | $t_7 = .25$ | $N_7=1.734$ | $V_7=51.0$ |
| $L_7$ | $R_{10}= - 3.005$ | $s_3 = .004$ | | |
| $L_8$ | $R_{11}= + 1.664$ | $t_8 = .17$ | $N_8=1.745$ | |
| | $R_{12}= - 8.506$ | $s_4 = 1.758$ [1] .832 [2] .352 [3] | | |
| $L_9$ | $R_{13}= - .378$ | $t_9 = .195$ | | |
| | $R_{14}= + 1.173$ | $s_5 = .095$ | | |
| $L_{10}$ | $R_{15}= - .984$ | $t_{10}= .12$ | | |
| | $R_{16}= - .470$ | $s_6 = .005$ | | |
| $L_{11}$ | $R_{17}= + .720$ | $t_{11}= .12$ | | |
| | $R_{18}= - 3.063$ | $s_7 = .005$ | | |
| $L_{12}$ | $R_{19}= + .757$ | $t_{12}= .05$ | | |
| $L_{13}$ | $R_{20}= + .269$ | $t_{13}= .13$ | | |
| | $R_{21}= + 3.337$ | | | |

[1] Telephoto. [2] Median. [3] Wide angle.

In the example of Table 4, the aperture stop is preferably located 0.14″ in front of surface $R_{13}$.

FIGURES 4, 5 and 6 are graphs showing the spherical aberration (solid lines) and sine condition coma (dashed lines) for the example of Table 4 at the telephoto, median and wide angle positions respectively. The ordinates represent heights of incident rays, and the abscissae represent the respective aberrations measured in the axial direction, both in hundredths of an inch.

FIGURES 7, 8 and 9 are graphs showing curvatures of the sagittal image (solid lines) and of the tangential image (dashed lines) for the example of Table 4 at the telephoto, median and wide angle positions, respectively. The ordinates represent slope angles of incident principal rays in degrees and the abscissae represent the respective curvatures measured as deviations from the paraxial image plane in hundredths of an inch.

FIGURES 10, 11 and 12 are graphs showing the distortion for the example of Table 4 at the telephoto, median and wide angle positions respectively. The abscissae represent the slope angles of incident principal rays in degrees and the ordinates the distortion in percent.

It will be evident without further explanation that all four examples embody the board features of the invention, and that the examples of Tables 3 and 4 have the preferred arrangement according to which the two movable members each consist of a cemented triplet in front of a simple element of the same sign. The aberrations of Examples 3 and 4 differ between themselves very little.

There is a slightly different selection of glass, and the radii are adjusted accordingly to restore the aberration residuals.

It is well known in the art that an internal pair of surfaces separated by a small airspace is equivalent to a cemented surface, and in U.S. Patent 1,479,229, Erfle, a formula is given defining the effective radius of such a pair. In the appended claims, it is intended that the terms "cemented surface," "compound component" and the like will include the closely airspaced forms.

What I claim as my invention is:

1. An optical zoom system comprising a positive member movable for zooming and mounted between and in axial alignment with a movable front negative member and a fixed rear positive member, in which the front negative member consists of a negative cemented triplet component and a negative single element in juxtaposition and both concave toward the rear, the front surface of the front component being convex, and in which the movable positive member consists of two biconvex components at least one of which is compound for achromatization, the movement of the front negative member being such as to maintain a fixed image position during zooming, and in which:

TABLE 1

E.F.L.=0.7851 (Telephoto)
.5422 (Intermediate)
.2575 (Wide Angle)

B.F.L.= .317

[In inches]

| | | | | |
|---|---|---|---|---|
| $L_1$ | $R_1 = +3.333$ | $t_1 =.040$ | $N_1 =1.651$ | $V_1 =55.8$ |
| | $R_2 = +1.724$ | $t_2 =.180$ | $N_2 =1.720$ | $V_2 =29.3$ |
| $L_2$ | $R_3 = -1.075$ | $t_3 =.040$ | $N_3 =1.651$ | $V_3 =55.8$ |
| $L_3$ | $R_4 = +1.082$ | $s_1 =.095$ | | |
| | $R_5 = +9.091$ | $t_4 =.050$ | $N_4 =1.734$ | $V_4 =51.0$ |
| $L_4$ | $R_6 = +1.149$ | $s_2 = .210$ [1] .479 [2] 1.515 [3] | | |
| $L_5$ | $R_7 = +3.509$ | $t_5 =.120$ | $N_5 =1.697$ | $V_5 =56.2$ |
| | $R_8 = -2.564$ | $s_3 =.004$ | | |
| $L_6$ | $R_9 = +1.000$ | $t_6 =.170$ | $N_6 =1.637$ | $V_6 =55.5$ |
| $L_7$ | $R_{10}= -2.500$ | $t_7 =.040$ | $N_7 =1.751$ | $V_7 =27.7$ |
| | $R_{11}= +.909$ | | | |
| $L_8$ | $R_{12}= -3.030$ | $t_8 =.150$ | $N_8 =1.697$ | $V_8 =56.2$ |
| | | $s_4 =1.000$ [1] .654 [2] .247 [3] | | |
| $L_9$ | $R_{13}= -.377$ | $t_9 =.180$ | $N_9 =1.649$ | $V_9 =35.8$ |
| | $R_{14}= +.961$ | $s_5 =.095$ | | |
| $L_{10}$ | $R_{15}= -1.351$ | $t_{10}=.120$ | $N_{10}=1.734$ | $V_{10}=51.0$ |
| | $R_{16}= -.469$ | $s_6 =.005$ | | |
| $L_{11}$ | $R_{17}= +.735$ | $t_{11}=.120$ | $N_{11}=1.734$ | $V_{11}=51.0$ |
| | $R_{18}= -2.237$ | $s_7 =.005$ | | |
| $L_{12}$ | $R_{19}= +.840$ | $t_{12}=.040$ | $N_{12}=1.720$ | $V_{12}=29.3$ |
| $L_{13}$ | $R_{20}= +.333$ | $t_{13}=.150$ | $N_{13}=1.697$ | $V_{13}=56.2$ |
| | $R_{21}= +3.333$ | | | |

[1] Telephoto. [2] Intermediate. [3] Wide angle.

wherein L is the element; R is the radius of curvature of the optical surface; t is the axial thickness of the optical element; s is the space between elements; N is the index of refraction; and V is the conventional dispersive index the subscripts for all the parameters being numbered from front to rear.

2. An optical zoom system comprising a positive member movable for zooming and mounted between and in axial alignment with a movable front negative member and a fixed rear positive member, in which the front negative member consists of a negative cemented triplet component and a negative single element in juxtaposition and both concave toward the rear, the front surface of the front component being convex, and in which the movable positive member consists of a positive cemented triplet component for achromatization and a positive singlet component, at least one of the two components being biconvex, the movement of the front negative member being such as to maintain a fixed image position during zooming, and wherein:

TABLE 2

E.F.L.=1.064 (Telephoto)
.530 (Median)
.258 (Wide Angle)
B.F.L.= .346

[In inches]

| | | | | |
|---|---|---|---|---|
| $L_1$ | $R_1 = +3.333$ | $t_1 = .050$ | $N_1 = 1.734$ | $V_1 = 51.0$ |
| | $R_2 = +1.471$ | $s_1 = .075$ | | |
| $L_2$ | $R_3 = -100.0$ | $t_2 = .040$ | $N_2 = 1.734$ | $V_2 = 51.0$ |
| | $R_4 = +1.493$ | $t_3 = .220$ | $N_3 = 1.720$ | $V_3 = 29.3$ |
| $L_3$ | $R_5 = -1.493$ | $t_4 = .040$ | $N_4 = 1.734$ | $V_4 = 51.0$ |
| $L_4$ | $R_6 = +1.664$ | | | |
| | | $s_2 = .090$ [1] .750 [2] 2.150 [3] | | |
| $L_5$ | $R_7 = +2.105$ | $t_5 = .180$ | $N_5 = 1.651$ | $V_5 = 55.8$ |
| $L_6$ | $R_8 = -1.538$ | $t_6 = .040$ | $N_6 = 1.751$ | $V_6 = 27.7$ |
| $L_7$ | $R_9 = +1.538$ | $t_7 = .190$ | $N_7 = 1.651$ | $V_7 = 55.8$ |
| | $R_{10} = -2.165$ | $s_3 = .004$ | | |
| | $R_{11} = +1.258$ | | | |
| $L_8$ | $R_{12} = -9.804$ | $t_8 = .160$ | $N_8 = 1.620$ | $V_8 = 60.3$ |
| | | $s_4 = 1.690$ [1] .890 [2] .490 [3] | | |
| $L_9$ | $R_{13} = -.370$ | $t_9 = .180$ | $N_9 = 1.589$ | $V_9 = 61.0$ |
| | $R_{14} = +1.218$ | $s_5 = .100$ | | |
| $L_{10}$ | $R_{15} = -1.075$ | $t_{10} = .110$ | $N_{10} = 1.755$ | $V_{10} = 47.2$ |
| | $R_{16} = -.483$ | $s_6 = .005$ | | |
| $L_{11}$ | $R_{17} = +.739$ | $t_{11} = .110$ | $N_{11} = 1.697$ | $V_{11} = 56.2$ |
| | $R_{18} = -2.451$ | $s_7 = .005$ | | |
| $L_{12}$ | $R_{19} = +.813$ | $t_{12} = .050$ | $N_{12} = 1.751$ | $V_{12} = 27.7$ |
| $L_{13}$ | $R_{20} = +.253$ | $t_{13} = .120$ | $N_{13} = 1.697$ | $V_{13} = 56.2$ |
| | $R_{21} = +3.333$ | | | |

[1] Telephoto. [2] Median. [3] Wide angle.

wherein L is the element; R is the radius of curvature of the optical surface; $t$ is the axial thickness of the optical element; $s$ is the space between elements; N is the index of refraction; and V is the conventional dispersive index the subscripts for all the parameters being numbered from front to rear.

3. An optical zoom system comprising a positive member movable for zooming and mounted between and in axial alignment with a movable front negative member and a fixed rear positive member, in which the front negative member consists of a negative cemented triplet component and a negative single element in juxtaposition and both concave toward the rear, the front surface of the front component being convex, and in which the movable positive member consists of two biconvex components made up of a total of four lens elements, there being two cemented surfaces each having negative power, the movement of the front negative member being such as to maintain a fixed image position during zooming, and in which:

TABLE 3

E.F.L.=1.0181 (Telephoto)
.7522 (Intermediate)
.2589 (Wide Angle)
B.F.L.= .416

[In inches]

| | | | | |
|---|---|---|---|---|
| $L_1$ | $R_1 = +12.853$ | $t_1 = .040$ | $N_1 = 1.697$ | $V_1 = 56.2$ |
| | $R_2 = +2.320$ | $t_2 = .250$ | $N_2 = 1.751$ | $V_2 = 27.7$ |
| $L_2$ | $R_3 = -1.250$ | | | |
| | $R_4 = +1.800$ | $t_3 = .040$ | $N_3 = 1.697$ | $V_3 = 56.2$ |
| $L_3$ | | $s_1 = .090$ | | |
| | $R_5 = -10.916$ | $t_4 = .040$ | $N_4 = 1.751$ | $V_4 = 27.7$ |
| $L_4$ | $R_6 = +2.631$ | | | |
| | | $s_2 = .095$ [1] .357 [2] 2.350 [3] | | |
| $L_5$ | $R_7 = +6.482$ | $t_5 = .135$ | $N_5 = 1.697$ | $V_5 = 56.2$ |
| $L_6$ | $R_8 = -3.200$ | $t_6 = .040$ | $N_6 = 1.720$ | $V_6 = 29.3$ |
| $L_7$ | $R_9 = +.957$ | $t_7 = .250$ | $N_7 = 1.697$ | $V_7 = 56.2$ |
| | $R_{10} = -2.883$ | $s_3 = .004$ | | |
| | $R_{11} = +1.559$ | | | |
| $L_8$ | $R_{12} = -11.110$ | $t_8 = .170$ | $N_8 = 1.734$ | $V_8 = 51.0$ |
| | | $s_4 = 1.880$ [1] 1.392 [2] .480 [3] | | |
| $L_9$ | $R_{13} = -.349$ | $t_9 = .195$ | $N_9 = 1.589$ | $V_9 = 61.0$ |
| | $R_{14} = +1.392$ | $s_5 = .095$ | | |
| $L_{10}$ | $R_{15} = -.957$ | $t_{10} = .110$ | $N_{10} = 1.697$ | $V_{10} = 56.2$ |
| | $R_{16} = -.434$ | $s_6 = .005$ | | |
| $L_{11}$ | $R_{17} = +.720$ | $t_{11} = .110$ | $N_{11} = 1.697$ | $V_{11} = 56.2$ |
| | $R_{18} = -3.950$ | $s_7 = .005$ | | |
| $L_{12}$ | $R_{19} = +.826$ | $t_{12} = .040$ | $N_{12} = 1.751$ | $V_{12} = 27.7$ |
| $L_{13}$ | $R_{20} = +.279$ | $t_{13} = .160$ | $N_{13} = 1.697$ | $V_{13} = 56.2$ |
| | $R_{21} = +3.337$ | | | |

[1] Telephoto. [2] Intermediate. [3] Wide angle.

wherein L is the element; R is the radius of curvature of the optical surface; $t$ is the axial thickness of the optical element; $s$ is the space between elements; N is the index of refraction; and V is the conventional dispersive index the subscripts for all the parameters being numbered from front to rear.

No references cited.

DAVID H. RUBIN, *Primary Examiner.*

JEWELL H. PEDERSEN, *Examiner.*

R. J. STERN, *Assistant Examiner.*